US012706260B2

(12) United States Patent
Jhuang et al.

(10) Patent No.: US 12,706,260 B2
(45) Date of Patent: Aug. 11, 2026

(54) LONG-TYPE KEY STRUCTURE

(71) Applicant: Primax Electronics Ltd., Taipei (TW)

(72) Inventors: Chuang-Shu Jhuang, Taipei (TW); Sheng-Huang Huang, Taipei (TW); Chien-Hung Liu, Taipei (TW); Lei-Lung Tsai, Taipei (TW)

(73) Assignee: Primax Electronics Ltd., Taipei (TW)

( * ) Notice: Subject to any disclaimer, the term of this patent is extended or adjusted under 35 U.S.C. 154(b) by 274 days.

(21) Appl. No.: 18/629,450

(22) Filed: Apr. 8, 2024

(65) Prior Publication Data

US 2025/0285820 A1 Sep. 11, 2025

(30) Foreign Application Priority Data

Mar. 7, 2024 (CN) ......................... 202410264742.9

(51) Int. Cl.
*H01H 13/14* (2006.01)
*H01H 13/10* (2006.01)
*H01H 13/20* (2006.01)

(52) U.S. Cl.
CPC ............ *H01H 13/14* (2013.01); *H01H 13/10* (2013.01); *H01H 13/20* (2013.01)

(58) Field of Classification Search
CPC ........... H01H 2003/02; H01H 2003/12; H01H 2013/00; H01H 2013/02; H01H 2013/50; H01H 2013/52; H01H 2221/058; H01H 2221/062; H01H 13/00; H01H 13/02; H01H 13/04; H01H 13/14; H01H 13/10; H01H 13/20; H01H 13/50; H01H 13/52; H01H 13/70; H01H 13/705; H01H 13/85; H01H 3/00; H01H 3/02; H01H 3/12; H01H 3/125; H01H 3/32
USPC .................................................. 200/5 A, 341
See application file for complete search history.

(56) References Cited

U.S. PATENT DOCUMENTS

2016/0093455 A1* 3/2016 Maruyama ........... H01H 13/702
200/341

FOREIGN PATENT DOCUMENTS

CN 204011186 U * 12/2014
CN 205920913 U * 2/2017

* cited by examiner

*Primary Examiner* — Anthony R Jimenez
(74) *Attorney, Agent, or Firm* — KIRTON McCONKIE; Evan R. Witt

(57) ABSTRACT

A long-type key structure is provided. The structure of the long-type key structure is specially designed. Consequently, the vibration noise of the metal moving parts and the key pressing stroke delay can be effectively reduced, and the pressing feel can be enhanced. The long-type key structure includes a keycap, a base plate and a supporting element. The supporting element includes an outer scissor frame, at least two inner scissor frame and a metallic reinforcement plate. The metallic reinforcement plate is combined on the surface of the outer scissor frame.

6 Claims, 11 Drawing Sheets

LONG-TYPE KEY STRUCTURE

FIELD OF THE INVENTION

The present invention relates to the structure of an input device, and more particularly to a key structure.

BACKGROUND OF THE INVENTION

In modern societies, electronic products become indispensable parts in human lives. The electronic products are applied in many sectors, including food, clothing, housing, transportation, education and entertainment. Generally, the electronic product is equipped with a keyboard for facilitating the user to input control signals.

Conventionally, a scissor-type supporting structure is one of the supporting elements for the key structures of the keyboard. The scissor-type supporting structure is made of a plastic material. When the scissor-type supporting structure is applied to a long-type key structure, the scissor-type supporting structure cannot provide sufficient structural strength for transmitting the pressing force because the plastic material has its strength limit. Consequently, when the corner of the keycap of the key structure is pressed by the user, the pressing feel is usually not satisfied.

In order to increase the structural strength of the supporting element, the existing technology also uses two metal brackets and a plastic scissor-type supporting structure to overcome the insufficient structural strength problem of the scissor-type supporting structure.

The additional metal brackets may significantly increase the structural strength. However, the addition of the metal brackets increases the manufacturing cost and the assembling cost of the overall key structure. Furthermore, when the metal brackets and similar moving parts are rotated or swung, the vibration noise is readily generated. In other words, the uses of the additional metal brackets cannot meet the needs of some consumers who pursue extremely quiet use while working.

In order to overcome the drawbacks of the conventional technologies, it is important to provide an improved long-type key structure for reducing the vibration noise when the metal moving parts are rotated or swung, reducing the key pressing stroke delay when the key structure is pressed, and enhancing the pressing feel.

SUMMARY OF THE INVENTION

An object of the present invention provides a long-type key structure for reducing the vibration noise when the metal moving parts are rotated or swung. In addition, when the long-type key structure is pressed, the key pressing stroke delay is reduced, and the pressing feel is enhanced.

In accordance with an aspect of the present invention, a long-type key structure is provided. The long-type key structure includes a keycap, a base plate and a supporting element. The supporting element includes an outer scissor frame, at least two inner scissor frames and a metallic reinforcement plate. The outer scissor frame includes a first end and a second end opposed to the first end. Each of the at least two inner scissor frames includes a third end and a fourth end opposed to the third end. The at least two inner scissor frames are pivotally coupled to the outer scissor frame and permitted to be swung relative to the outer scissor frame. The metallic reinforcement plate has a shape and a structure matching the outer scissor frame. The metallic reinforcement plate is combined on a surface of the outer scissor frame. The first end and the third end are connected with the keycap. The second end and the fourth end are connected with the base plate. Consequently, the keycap is movable upwardly or downwardly relative to the base plate.

In an embodiment, a bottom surface of the keycap is provided with plural rotary connection parts and plural movable connection parts, a first rod part is formed on the first end, a third rod part is formed on the third end, the first rod part is movably connected with the plural movable connection parts, and the third rod part is rotatably connected with the plural rotary connection parts.

In an embodiment, the third rod part is rotatably connected with at least two rotary connection parts of the plural rotary connection parts.

In an embodiment, the base plate includes plural base connection parts, a second rod part is formed on the second end, a fourth rod part is formed on the fourth end, and the second rod part and the fourth rod part are movably connected with the base connection parts.

In an embodiment, the long-type key structure further includes a metallic reinforcement bar. The metallic reinforcement bar is installed on a bottom surface of the keycap and circumferentially arranged beside a long side and a short side of the keycap.

In an embodiment, plural coupling parts are formed on the bottom surface of the keycap and arranged beside the long side and the short side of the keycap. The metallic reinforcement bar is coupled with the plural coupling parts.

In an embodiment, a raised platform structure is formed on the bottom surface of the keycap and arranged beside the short side of the keycap, and a portion of the metallic reinforcement bar beside the short side of the keycap is pushed by the raised platform structure. A distance between a top surface of the short side of the keycap and the metallic reinforcement bar is larger than a distance between the top surface of the long side of the keycap and the metallic reinforcement bar.

In an embodiment, a bent structure is formed on a periphery region of the metallic reinforcement plate, so that a weight of the metallic reinforcement plate is reduced.

From the above descriptions, the present invention provides a long-type key structure. Due to the combination of the outer scissor frame and the metallic reinforcement plate, the overall structural strength of the supporting element will be increased. When the key structure is pressed, the pressing force can be effectively transmitted through the supporting element, and the vibration noise generated when the metal moving parts are rotated or swung will be effectively reduced.

Furthermore, the third rod part of each inner scissor frame is connected with at least two rotary connection parts of the keycap. Consequently, the pressing feel of pressing the corner of the keycap can be effectively enhanced. Moreover, since the metallic reinforcement bars and the raised platform structures are installed on the long side and the short side of the bottom surface of the keycap, the pressing feel and key triggering sensitivity of pressing the key structure will be enhanced. In addition, the key pressing stroke delay can be effectively reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
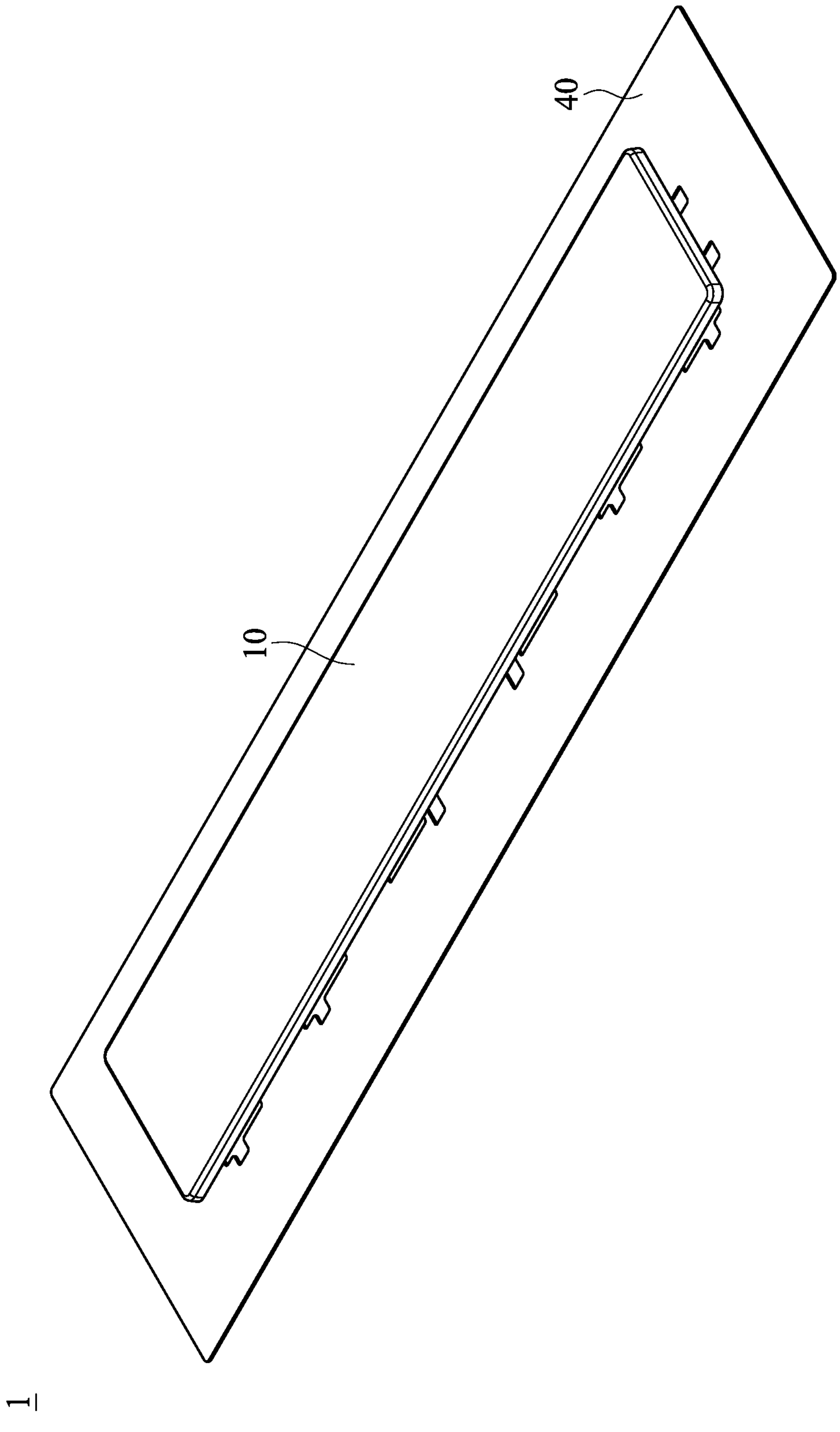
FIG. 1A is a schematic perspective view illustrating a long-type key structure according to an embodiment of the present invention.
Figure 1B:
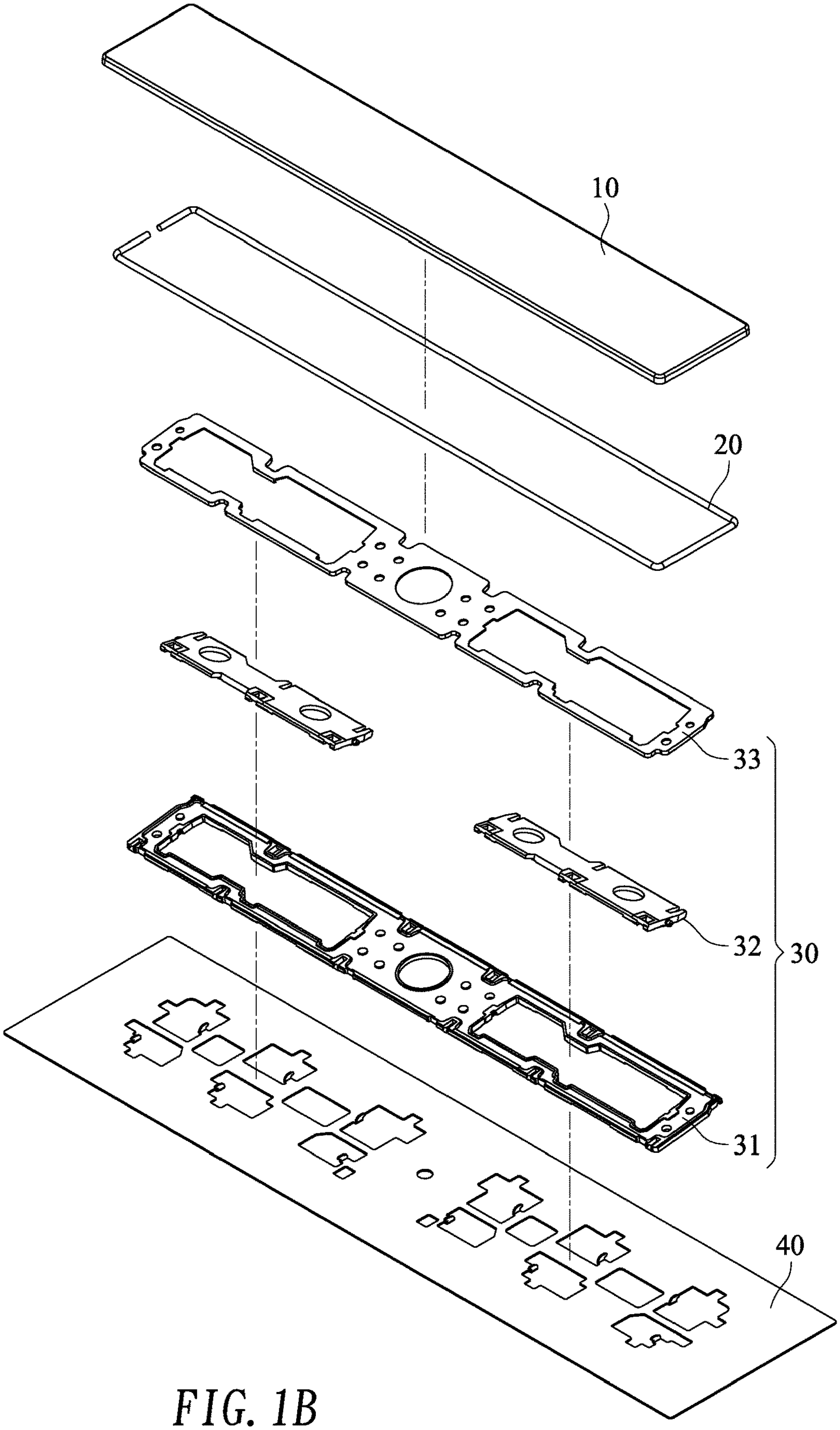
FIG. 1B is a schematic exploded view illustrating the long-type key structure according to the embodiment of the present invention.

Please refer to FIG. 1A and FIG. 1B. FIG. 1A is a schematic perspective view illustrating a long-type key structure according to an embodiment of the present invention. FIG. 1B is a schematic exploded view illustrating the long-type key structure according to the embodiment of the present invention. In an embodiment, the long-type key structure 1 comprises a keycap 10, two metallic reinforcement bars 20, a supporting element 30 and a base plate 40.

The supporting element 30 comprises an outer scissor frame 31, two inner scissor frames 32 and a metallic reinforcement plate 33. The inner scissor frames 32 and the outer scissor frame 31 are pivotally coupled to each other. Consequently, the inner scissor frames 32 can be swung relative to the outer scissor frame 31. The metallic reinforcement plate 33 is correspondingly connected with the surface of the outer scissor frame 31. For succinctness, the switch circuit board, the elastic element and the associated component over the base plate 40 are omitted.

Figure 2:
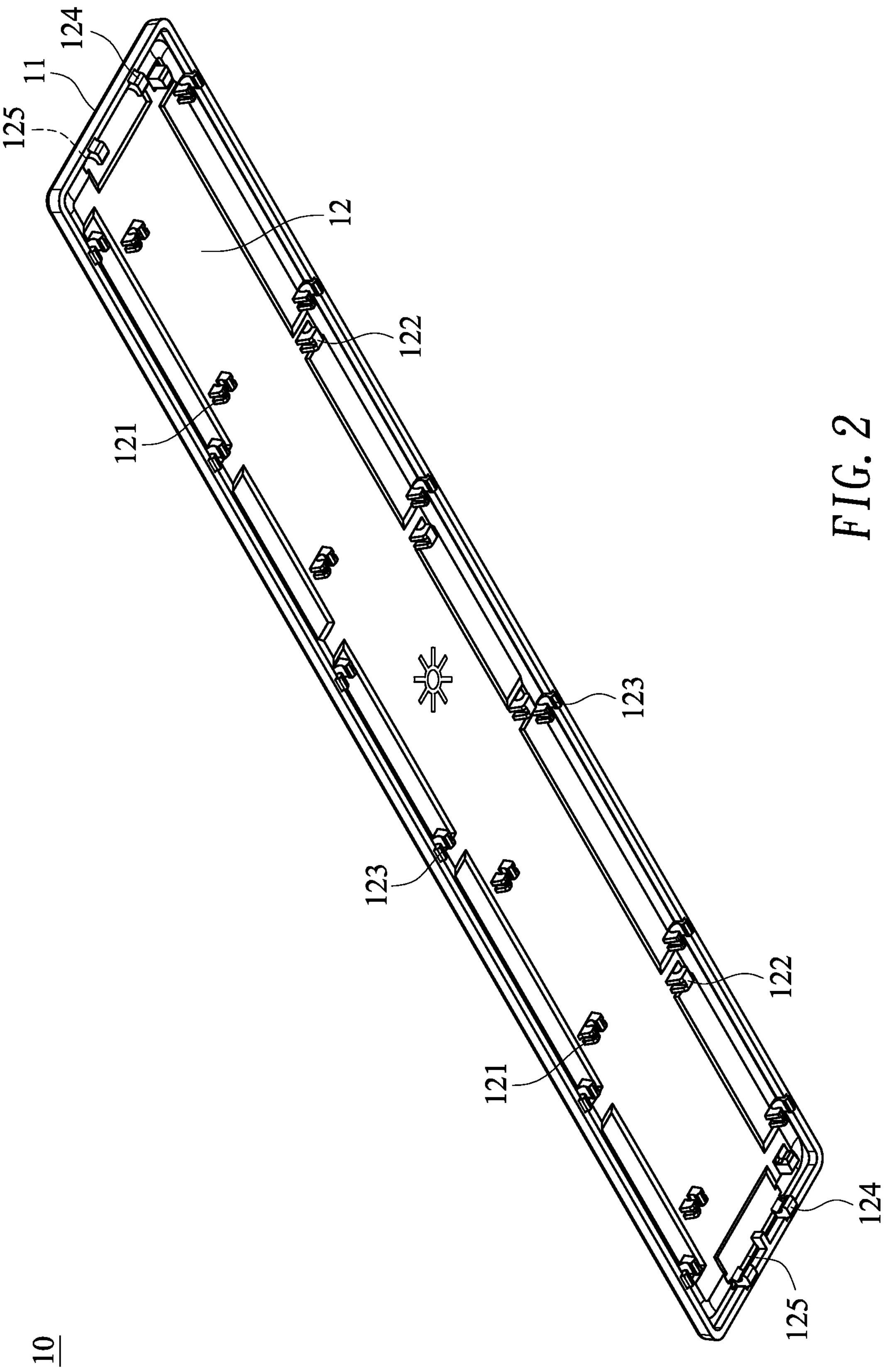
FIG. 2 is a schematic perspective view illustrating the keycap of the long-type key structure according to the embodiment of the present invention and taken along a viewpoint.

FIG. 2 is a schematic perspective view illustrating the keycap of the long-type key structure according to the embodiment of the present invention and taken along a viewpoint. The keycap 10 has a top surface 11 and a bottom surface 12. The bottom surface 12 of the keycap 10 is provided with plural rotary connection parts 121, plural movable connection parts 122 and plural coupling parts 123 and 124. For example, the plural rotary connection parts 121 include six rotary connection parts 121 in a linear arrangement, and the plural movable connection parts 122 include six movable connection parts 122 in a linear arrangement. The coupling parts 123 are located at the long sides of the keycap 10. The coupling parts 124 are located at the short sides of the keycap 10. The metallic reinforcement bars 20 shown in FIG. 1B are coupled by the coupling parts 123 and 124. In an embodiment, the bottom surface 12 of the keycap 10 is further provided with raised platform structures 125 at the short sides of the keycap 10 adjacent to the corners of the coupling parts 124.

Figure 3:
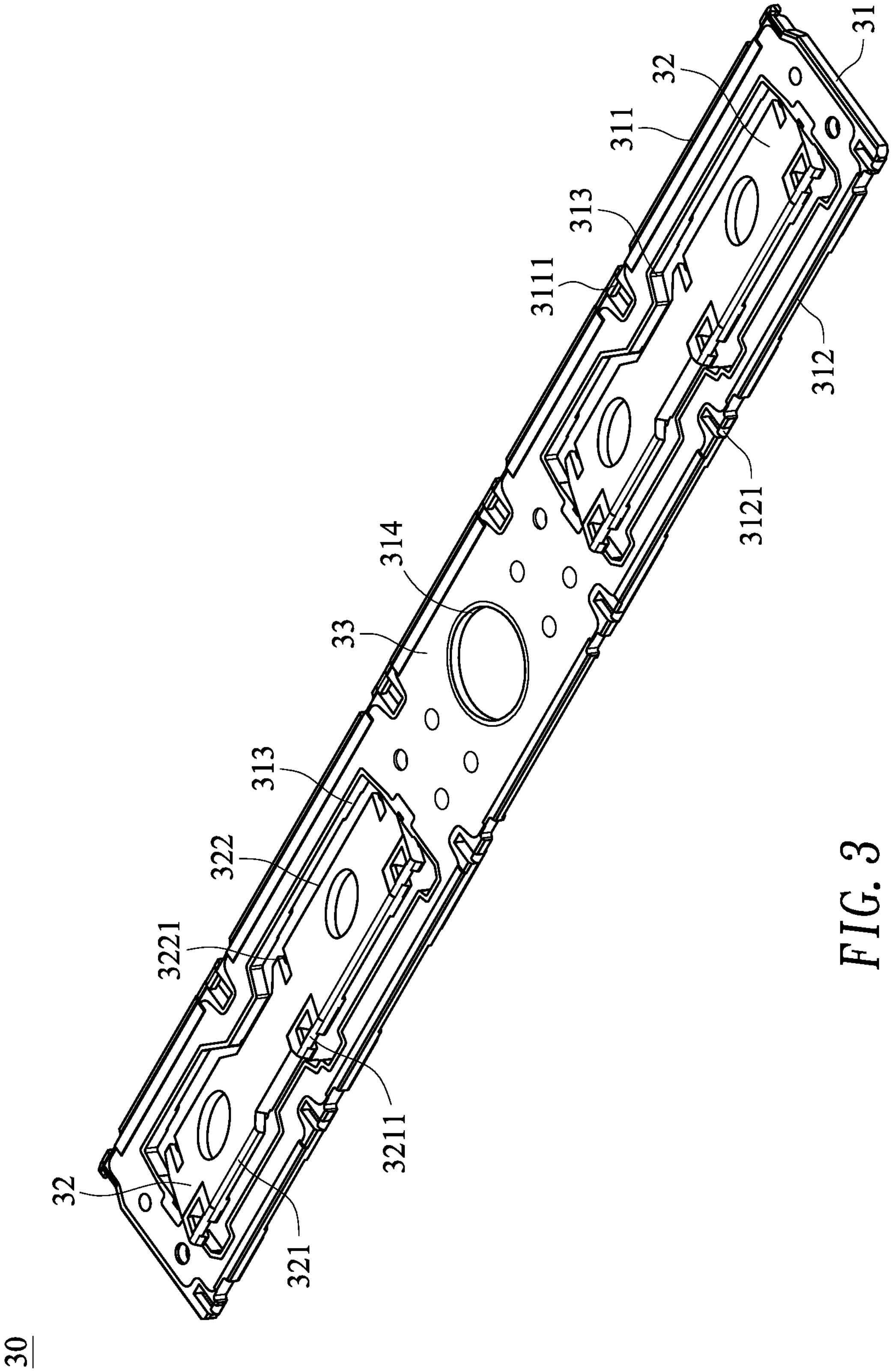
FIG. 3 is a schematic perspective view illustrating the supporting element of the long-type key structure according to the embodiment of the present invention and taken along a viewpoint.

FIG. 3 is a schematic perspective view illustrating the supporting element of the long-type key structure according to the embodiment of the present invention and taken along a viewpoint. The outer scissor frame 31 and the inner scissor frames 32 are made of non-metallic material (e.g., plastic material). The outer scissor frame 31 has a first end 311 and a second end 312, which are opposed to each other. A first rod part 3111 is formed on the first end 311 of the outer scissor frame 31. A second rod part 3121 is formed on the second end 312 of the outer scissor frame 31. The inner scissor frame 32 has a third end 321 and a fourth end 322, which are opposed to each other. A third rod part 3211 is formed on the third end 321 of the inner scissor frame 32. A fourth rod part 3221 is formed on the fourth end 322 of the inner scissor frame 32. In this embodiment, the total surface area of the outer scissor frame 31 is greater than the total surface area of the two inner scissor frames 32. In addition, the outer scissor frame 31 comprises two mounting openings 313. The shapes of the mounting openings 313 match the shapes of the corresponding inner scissor frames 32. The inner scissor frames 32 are installed in the corresponding mounting openings 313 and pivotally coupled to the outer scissor frame 31. Consequently, the inner scissor frames 32 can be swung relative to the outer scissor frame 31.

The shape and the structure of the metallic reinforcement plate 33 match the shape and the structure of the outer scissor frame 31. Since the outer scissor frame 31 has the large total surface area, the metallic reinforcement plate 33 can be combined on the surface of the outer scissor frame 31 by using a hot melt process or an over-molding process. Due to the combination between the metallic reinforcement plate 33 and the outer scissor frame 31, the structural strength of the supporting element 30 is effectively enhanced. In this embodiment, the metallic reinforcement plate 33 is combined on the top surface of the outer scissor frame 31. It is noted that numerous modifications and alterations may be made while retaining the teachings of the invention. For example, in a variant example, the metallic reinforcement plate 33 is combined on the bottom surface of the outer scissor frame 31.

Figure 4:
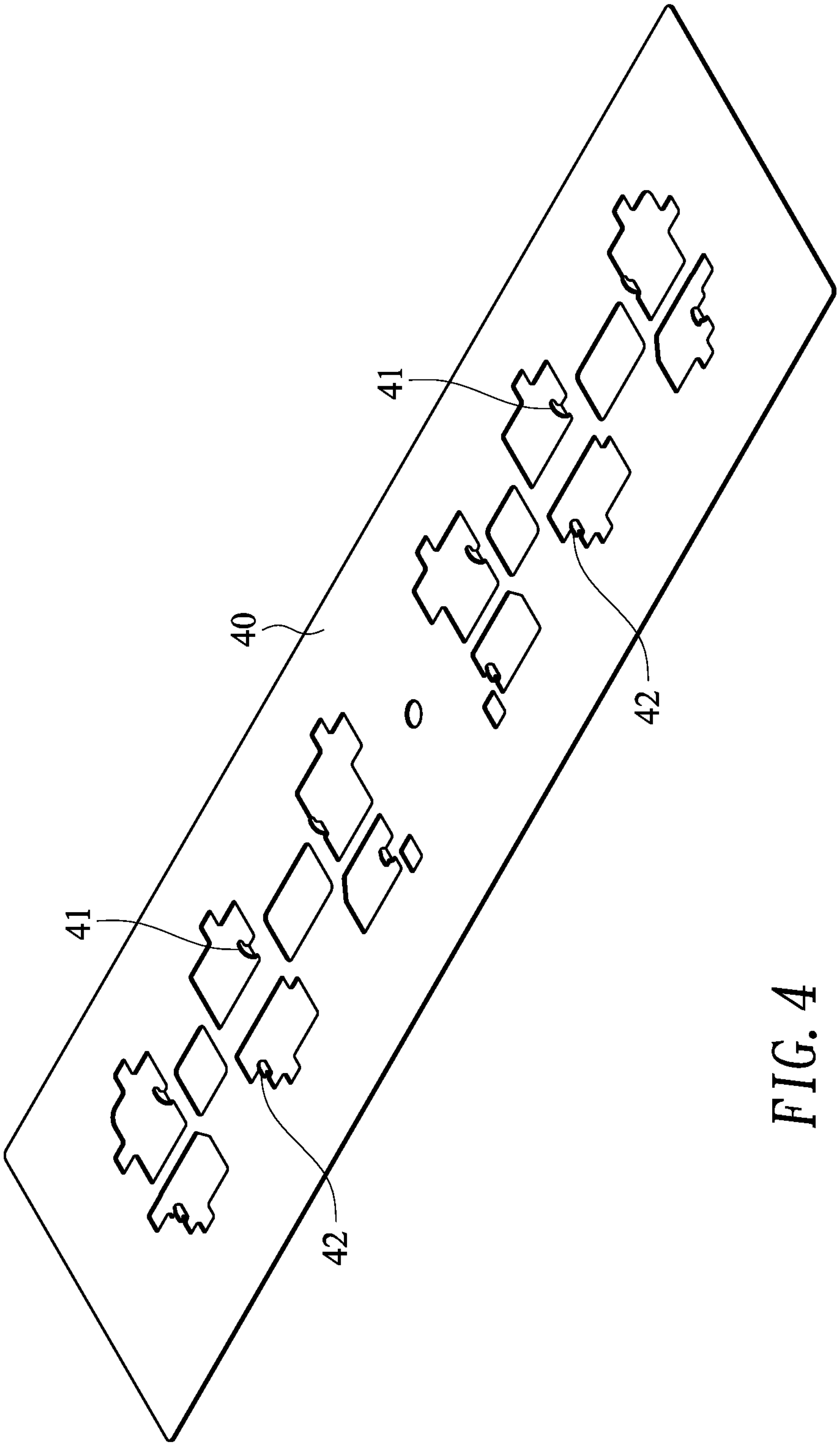
FIG. 4 is a schematic perspective view illustrating the base plate of the long-type key structure according to the embodiment of the present invention and taken along a viewpoint.

FIG. 4 is a schematic perspective view illustrating the base plate of the long-type key structure according to the embodiment of the present invention and taken along a viewpoint. The base plate 40 comprises plural base connection parts 41 and 42.

Figure 5A:
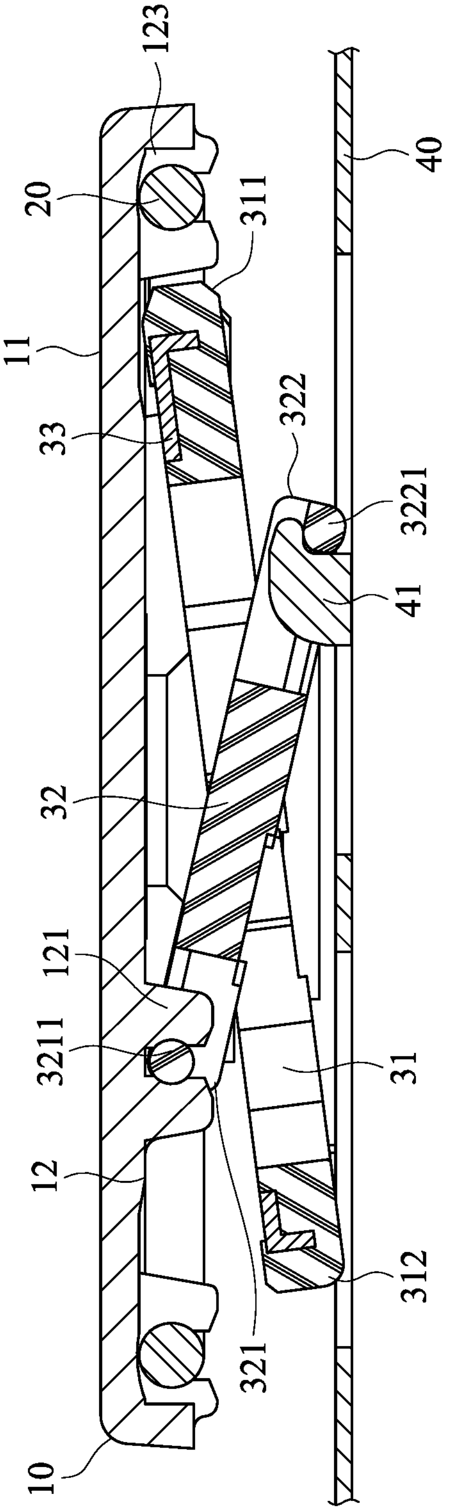
FIGS. 5A and 5B are schematic cross-sectional views illustrating the long-type key structure according to the embodiment of the present invention and taken along different viewpoints.
Figure 5B:
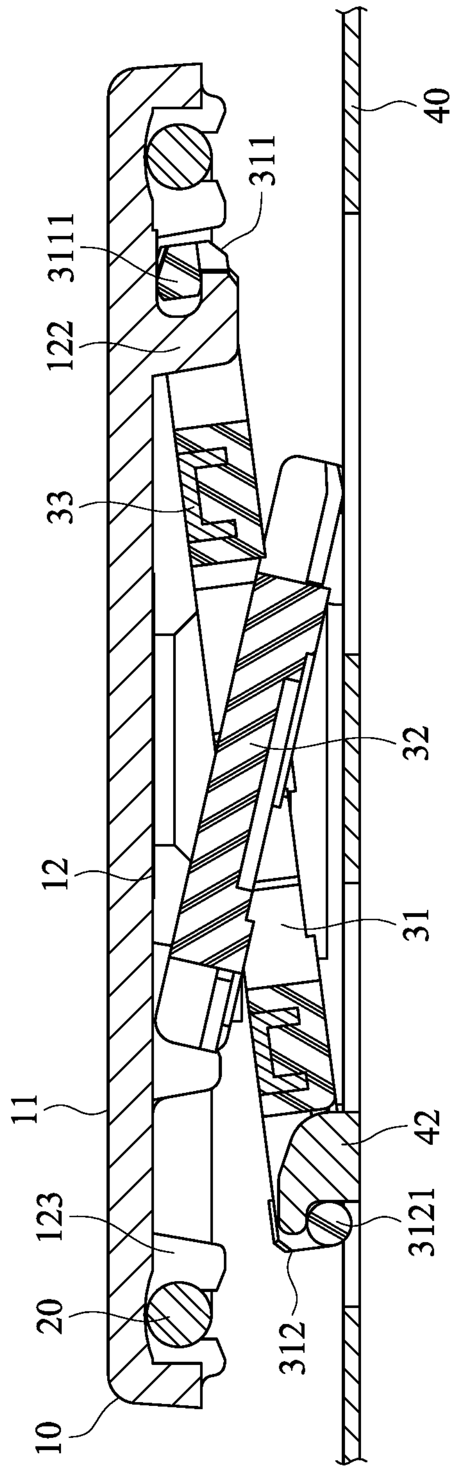

Please refer to FIGS. 5A and 5B. FIGS. 5A and 5B are schematic cross-sectional views illustrating the long-type key structure according to the embodiment of the present invention and taken along different viewpoints.

As shown in FIG. 5A, the third rod part 3211 on the third end 321 of the inner scissor frame 32 is rotatably connected with the rotary connection parts 121 of the keycap 10. In the production process of the long-type key structure 1, the number of the rotary connection parts 121 may be adjusted according to the practical requirements. For example, the number of the rotary connection parts 121 is two or more than two. In addition, the fourth rod part 3221 on the fourth end 322 of the inner scissor frame 32 are movably connected with the base connection parts 41 of the base plate 40.

As shown in FIG. 5B, the first rod part 3111 on the first end 311 of the outer scissor frame 31 is movably connected with the movable connection parts 122 of the keycap 10. In addition, the second rod part 3121 on the second end 312 of the outer scissor frame 31 is movably connected with the base connection parts 42 of the base plate 40. Due to the connection between the keycap 10 and the supporting element 30, the keycap 10 can be moved upwardly or downwardly relative to the base plate 40.

In this embodiment, the third rod part 3211 on the third end 321 of each inner scissor frame 32 is pivotally coupled to three rotary connection parts 121 of the keycap 10. Since three rotary connection parts 121 and the third rod part 3211 are pivotally coupled to each other, the pressing feel on the corner of the keycap 10 will be further enhanced.

Figure 6A:
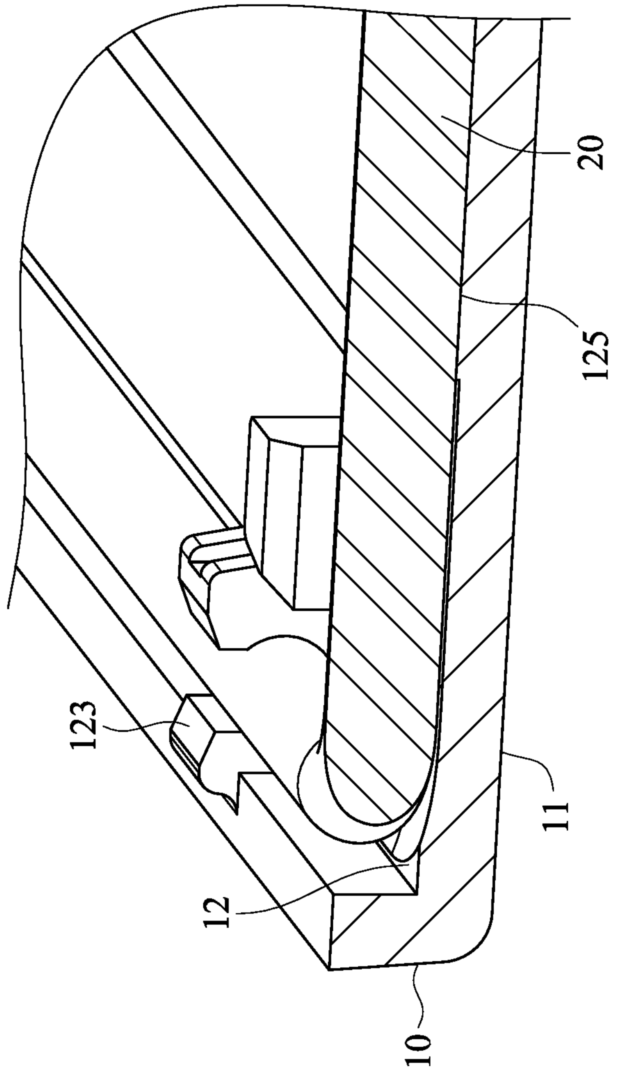
FIG. 6A is a schematic cutaway view illustrating the installation of the metallic reinforcement bar in the long-type key structure of the present invention.
Figure 6B:
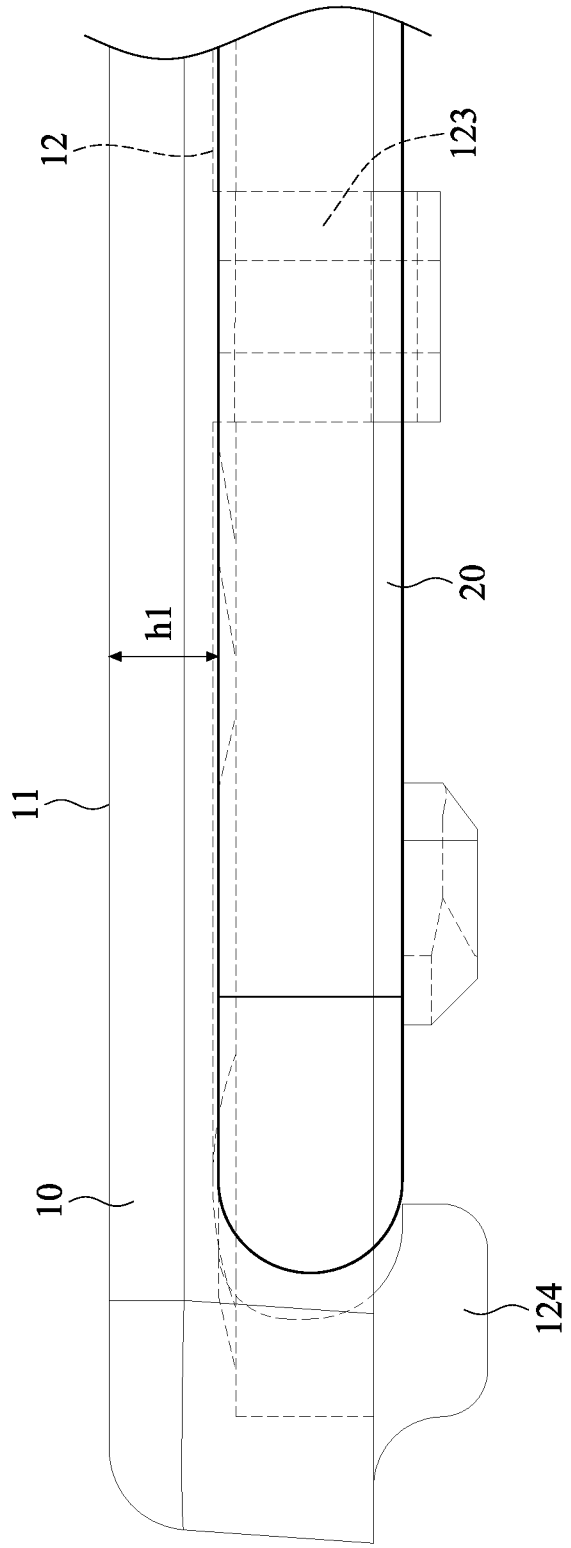
FIG. 6B is a schematic side view illustrating the long side of the keycap in the long-type key structure of the present invention.
Figure 6C:
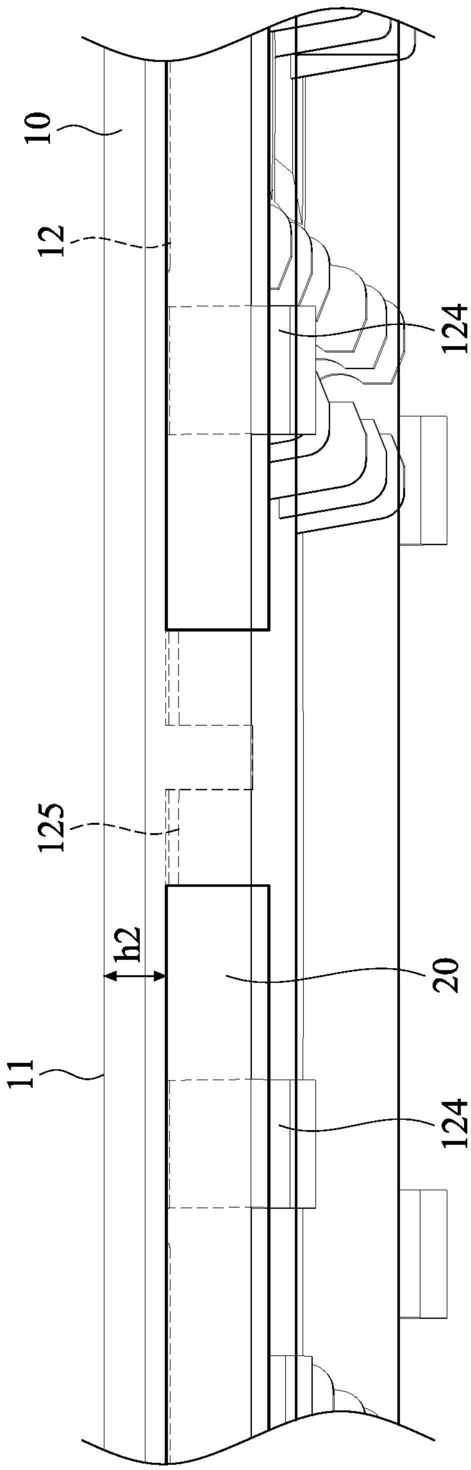
FIG. 6C is a schematic side view illustrating the short side of the keycap in the long-type key structure of the present invention.

Please refer to FIGS. 6A, 6B and 6C. FIG. 6A is a schematic cutaway view illustrating the installation of the metallic reinforcement bar in the long-type key structure of the present invention. FIG. 6B is a schematic side view illustrating the long side of the keycap in the long-type key structure of the present invention. FIG. 6C is a schematic side view illustrating the short side of the keycap in the long-type key structure of the present invention.

As shown in FIG. 6A, the metallic reinforcement bar 20 is pressed into and engaged with the coupling parts 123 and 124 on the bottom surface 12 of the keycap 10. Consequently, the metallic reinforcement bar 20 is circumferentially arranged beside the long side and the short side of the keycap 10. Moreover, the portion of the metallic reinforcement bar 20 beside the short side of the keycap 10 is pushed by the raised platform structures 125 at the short side of the keycap 10. Consequently, the portion of the metallic reinforcement bar 20 beside the short side of the keycap 10 is slightly separated from the bottom surface 12 of the keycap 10.

As shown in FIG. 6B, the distance between the top surface 11 of the long side of the keycap 10 and the metallic reinforcement bar 20 is h1. As shown in FIG. 6C, the distance between the top surface 11 of the short side of the keycap 10 and the metallic reinforcement bar 20 is h2. Since the portion of the metallic reinforcement bar 20 beside the short side of the keycap 10 is pushed by the raised platform structures 125, the distance h2 between the top surface 11 of the short side of the keycap 10 and the metallic reinforcement bar 20 is larger than the distance h1 between the top surface 11 of the long side of the keycap 10 and the metallic reinforcement bar 20. Consequently, the four corners of the keycap 10 are slightly higher than the center of the keycap 10. Due to this structural design, the pressing feel and key triggering sensitivity of pressing the key structure will be enhanced. In addition, the key pressing stroke delay can be effectively reduced.

Figure 7B:
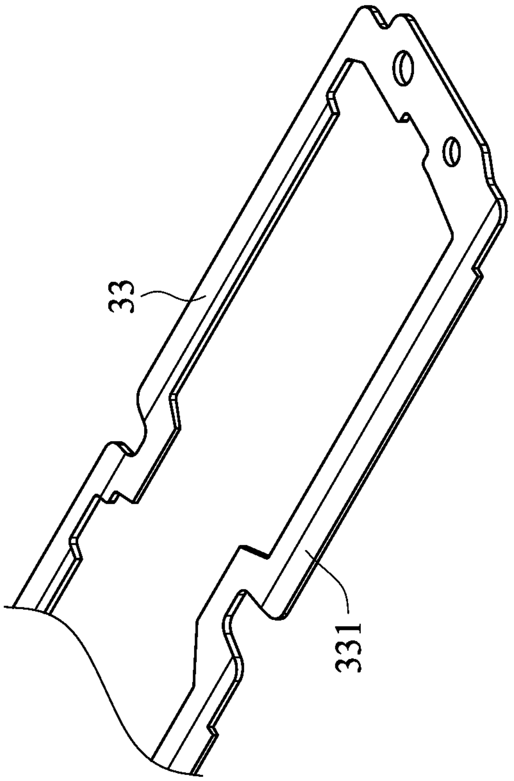
FIG. 7B is a schematic perspective view illustrating a portion of the structure of a second exemplary metallic reinforcement bar.
Figure 7A:
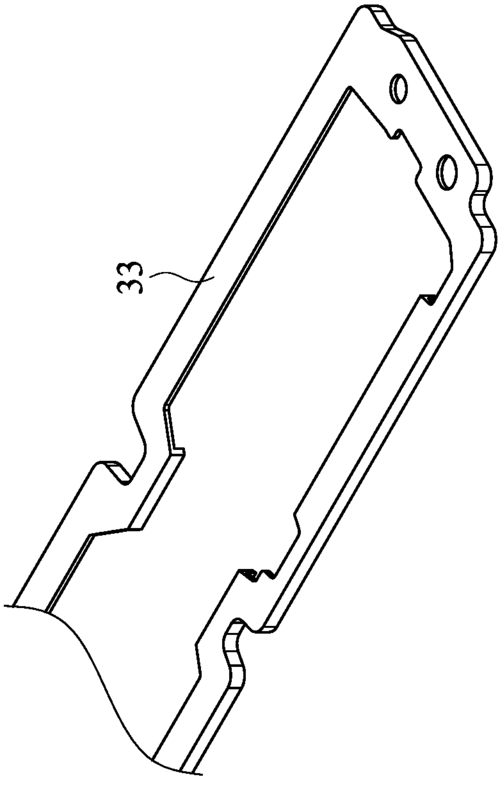
FIG. 7A is a schematic perspective view illustrating a portion of the structure of a first exemplary metallic reinforcement bar.

Please refer to FIGS. 7A and 7B. FIG. 7A is a schematic perspective view illustrating a portion of the structure of a first exemplary metallic reinforcement bar. FIG. 7B is a schematic perspective view illustrating a portion of the structure of a second exemplary metallic reinforcement bar.

In the example of FIG. 7A, the shape and the structure of the metallic reinforcement plate 33 match the shape and the structure of the outer scissor frame 31 shown in FIG. 3. Consequently, the metallic reinforcement plate 33 can be flatly covered and combined with the surface of the outer scissor frame 31.

In the example of FIG. 7B, the periphery region of the metallic reinforcement plate 33 is additionally equipped with a bent structure 331. Consequently, the thickness of the metallic reinforcement plate 33 can be reduced, and the weight of the metallic reinforcement plate 33 can be further reduced.

From the above descriptions, the present invention provides a long-type key structure. Due to the combination of the outer scissor frame and the metallic reinforcement plate, the overall structural strength of the supporting element will be increased. When the key structure is pressed, the pressing force can be effectively transmitted through the supporting element, and the vibration noise generated when the metal moving parts are rotated or swung will be effectively reduced. Furthermore, the third rod part of each inner scissor frame is connected with at least two rotary connection parts of the keycap. Consequently, the pressing feel of pressing the corner of the keycap can be effectively enhanced. Moreover, since the metallic reinforcement bars and the raised platform structures are installed on the long side and the short side of the bottom surface of the keycap, the pressing feel and key triggering sensitivity of pressing the key structure will be enhanced. In addition, the key pressing stroke delay can be effectively reduced. In other words, the technologies of the present invention are industrially valuable.

While the invention has been described in terms of what is presently considered to be the most practical and preferred embodiments, it is to be understood that the invention needs not be limited to the disclosed embodiments. It is intended to cover various modifications and similar arrangements included within the spirit and scope of the appended claims which are to be accorded with the broadest interpretation so as to encompass all such modifications and similar structures.

What is claimed is:

1. A key structure, comprising:

a keycap;

a base plate; and a supporting element comprising:

an outer scissor frame comprising a first end and a second end opposed to the first end;

at least two inner scissor frames, wherein each of the at least two inner scissor frames comprises a third end and a fourth end opposed to the third end, the at least two inner scissor frames are pivotally coupled to the outer scissor frame and permitted to be swung relative to the outer scissor frame;

a metallic reinforcement plate with a shape and a structure matching the outer scissor frame, wherein the metallic reinforcement plate is combined on a surface of the outer scissor frame; and a metallic reinforcement bar, wherein the metallic reinforcement bar is installed on a bottom surface of the keycap and circumferentially arranged beside a long side and a short side of the keycap, wherein a raised platform structure is formed on the bottom surface of the keycap and arranged beside the short side of the keycap, and a portion of the metallic reinforcement bar beside the short side of the keycap is pushed by the raised platform structure, wherein a distance between a top surface of the short side of the keycap and the metallic reinforcement bar is larger than a distance between a top surface of the long side of the keycap and the metallic reinforcement bar, wherein the first end and the third end are connected with the keycap, and the second end and the fourth end are connected with the base plate, so that the keycap is movable upwardly or downwardly relative to the base plate.

2. The key structure according to claim 1, wherein the base plate comprises plural base connection parts, a second rod part is formed on the second end, a fourth rod part is formed on the fourth end, and the second rod part and the fourth rod part are movably connected with the base connection parts.

3. The key structure according to claim 1, wherein plural coupling parts are formed on the bottom surface of the keycap and arranged beside the long side and the short side of the keycap, wherein the metallic reinforcement bar is coupled with the plural coupling parts.

4. The key structure according to claim 1, wherein a bent structure is formed on a periphery region of the metallic reinforcement plate, so that a weight of the metallic reinforcement plate is reduced.

5. The key structure according to claim 1, wherein the bottom surface of the keycap is provided with plural rotary connection parts and plural movable connection parts, a first rod part is formed on the first end, a third rod part is formed on the third end, the first rod part is movably connected with the plural movable connection parts, and the third rod part is rotatably connected with the plural rotary connection parts.

6. The key structure according to claim 5, wherein the third rod part is rotatably connected with at least two rotary connection parts of the plural rotary connection parts.

* * * * *